United States Patent [19]

Noland

[11] Patent Number: 4,606,373

[45] Date of Patent: Aug. 19, 1986

[54] FLOAT VALVE CONTROL ASSEMBLY

[76] Inventor: Wayne B. Noland, 340 Crescent Dr., Carlisle, Iowa 50047

[21] Appl. No.: 796,249

[22] Filed: Nov. 8, 1985

[51] Int. Cl.⁴ .................. F16K 31/24; F16K 33/00; A01K 7/04
[52] U.S. Cl. .................................... 137/426; 119/78; 137/443
[58] Field of Search .................. 119/78, 79, 80; 137/426, 443

[56]  References Cited
U.S. PATENT DOCUMENTS

| | | | |
|---|---|---|---|
| 2,521,794 | 9/1950 | Harvey et al. | 137/426 |
| 2,821,207 | 1/1958 | Linkert | 137/426 |
| 3,138,140 | 6/1964 | Byrd | 137/426 |
| 4,274,365 | 6/1981 | Peters | 137/426 |
| 4,471,798 | 9/1984 | Johannesen | 137/426 |

*Primary Examiner*—G. L. Walton
*Attorney, Agent, or Firm*—Henderson & Sturm

[57] ABSTRACT

This invention comprises an assembly (10) for controlling the level (64) of fluid, such as water (14), in a container (11), which invention includes a source of supply (29) for discharging the water (14) into the container (11), a valve (21) connected to the water source (29), a float (23) pivotally connected to the valve (21) for holding said valve (23) open or closed, depending upon the level of fluid in the container (11); the assembly (10) comprising a bracket (31) pivotally mounted within the container (11) and fastened to the valve (21) and float (23) as a unit, and a shaft (57) and screw (49) combination seated in a wall (33) of the container (11), with one end of the screw (49) non-rotatably mounted in the bracket (31), the shaft (57) manually rotatable from external the container (11) which rotation results in longitudinal movement of the screw (49) relative to the shaft (57), thereby pivoting the bracket (31) upwardly or downwardly in the container (11), resulting in varying very slightly—or more as the case may be, the position of the float (23) and thus varying accordingly the opening or closing of the valve (21) and the level (64) of water (14) within the container (11).

6 Claims, 5 Drawing Figures

FLOAT VALVE CONTROL ASSEMBLY

TECHNICAL FIELD

The present invention relates generally to float valve mechanisms for maintaining a certain level of fluid in a container, and more particularly to an adjustment mechanism controlling the position of the float valve and thus the level of fluid.

BACKGROUND ART

Conventional float valves have a valve adapted to close off an opening through which a fluid such as water flows into a container. To control the seating of the valve, for example, a ball-type float is connected to a lever in turn connected to the valve such that upon initial filling of the container, the location of the float maintains the valve open; however, as the container begins to fill, the float raises and begins closing the valve such that when the desired quantity of fluid has been received in the container, the float acts to completely seat or close the valve to prevent further fluid from entering the container through the opening.

To change the quantity of fluid passing into the container, or to vary the height of the fluid in the container at which the valve is closed, in one example a wing nut or other means of fastening the float to the valve is manipulated thereby enabling the position of the float to be changed relative to the stationary valve. The change further is normally manually made and quite often several adjustments need to be accomplished before the correct quantity or level is obtained.

Another example has the connecting end of the float rod threadably engaged with a valve lever, such that adjustment of the position of the float is effected by rotatably lengthening or shortening its extension from the valve, thereby effecting the closing of the valve and thus the level of fluid in the container.

This manual, trial-and-error method and apparatus for adjustment is made more difficult, time consuming, and frustrating by the fact that the manual adjustment requires disassembling the container to the extent that the normally enclosed float and valve connection is accessible to the person making the adjustment. Even the removal of a lid, as from a bathroom water closet, can present practical problems.

DISCLOSURE OF THE INVENTION

The above problems are substantially resolved, without undue compromise of other desirable attributes that are already provided by prior art devices, by the provision of the invention disclosed herein.

The object of this invention is to provide a new and novel control mechanism for a conventional float valve for a water tank or the like. This object is attained by mounting the entire float valve apparatus on a bracket, which bracket is itself pivotally mounted within the tank, and wherein a longitudinally adjustable device is mounted within a wall of the tank for manipulation from external the tank; the device engaging the bracket and operable to pivot it and the float valve in response to manipulation, thereby controlling the positioning of the float valve.

As a result of this unique apparatus for controlling the exact position of the float within the tank, an extremely fine adjustment of the float position is provided without removing the conventional lid of the tank. It is important to note that such a fine adjustment is not provided by the conventional float valve mechanism wherein an elbow connection is involved.

BRIEF DESCRIPTION OF THE DRAWINGS

These and other attributes of the invention will become more clear upon a thorough study of the following detailed description of the best mode for carrying out the invention, particularly when reviewed in conjunction with the drawings, wherein.

BEST MODE FOR CARRYING OUT THE INVENTION

Figure 5:
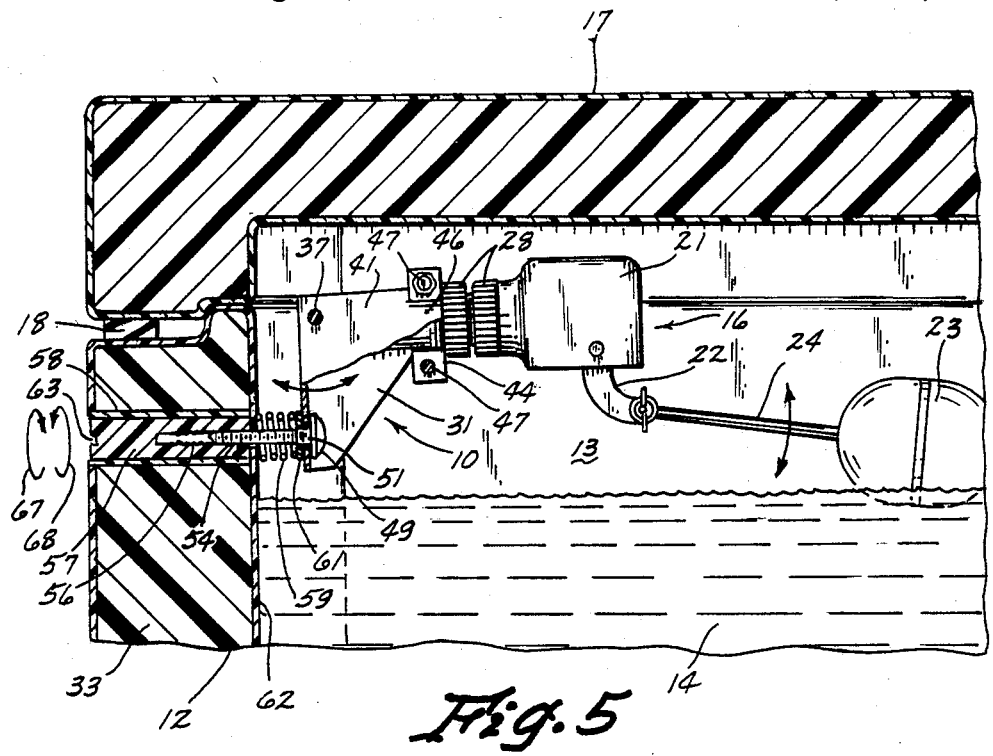
FIG. 5 is an enlarged view taken along the line 5—5 in FIG. 2.

Referring now to the drawings, the float valve control assembly of this invention is indicated generally at (10) in FIG. 5. The control assembly (10) is shown being applied to a livestock waterer (11) having a base (12) within which is formed a cavity or tank (13) adapted to hold a predetermined quantity of fluid such as water (14).

The level of the water (14) is controlled by a conventional float valve mechanism indicated generally by the numeral (16) mounted within the tank (13) below the lid (17) of the water (11), which closes with a seal (18) between the mating surfaces of the base (12) and lid (17). A pair of drinking bowls (19) for farm animals are formed on opposite sides of the base (12), which bowls are fluid connected with the tank (13) such that the level of fluid (14) in the tank (13) is the same as the level of the fluid (14) within the drinking bowls (19).

The float valve mechanism (16) includes the float valve (21) connected to a lever (22) depending toward the water (14), a ball-type float (23) which is mounted at the outer end of a stem (24), the stem inner end movably connected to the outer end of the float valve stem (24) by a wing nut (26), or the like. Thus, by changing the position of the float (23) and stem (24) relative to the valve (21) and lever (22), via unfastening and fastening the wing nut (26), the amount and level of water (14) within the tank (13) may be changed. When the float (23) is in a full "down" position, or moved clockwise as indicated by the arrow in FIG. 5, the valve (21) is fully open, whereby water supplied through intermediate L-tube (27) flows through the valve (21) and into the tank (13). Then as the water (14) fills the tank (13), the float (23) is raised in a counterclockwise direction by the filling water (14), thereby slowly closing the valve (21) such that when the proper level of water (14) is attained, the float (23) is raised to its highest position and the valve (21) is completely closed.

Figures 1, 2:
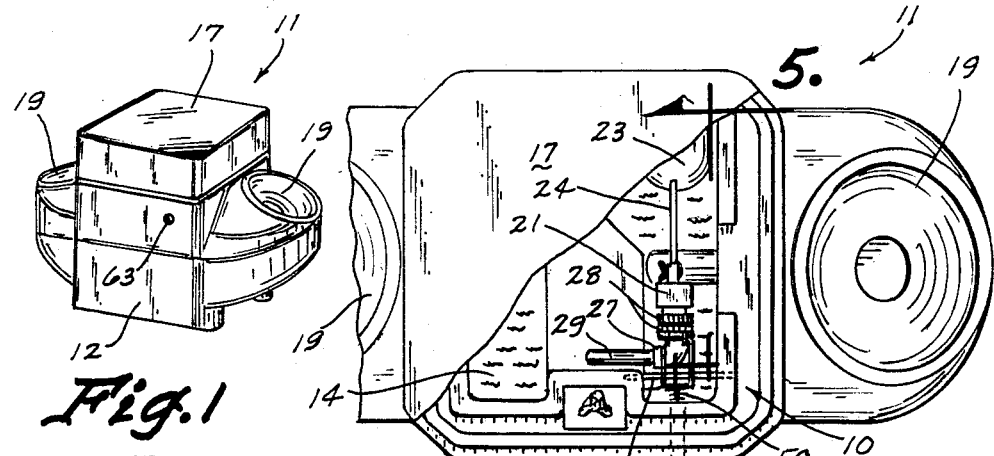
FIG. 1 is a perspective view of the livestock waterer within which this invention is mounted for special use therewith.
FIG. 2 is an enlarged plan view of the livestock waterer of FIG. 1, with a portion of the lid removed to show the interior thereof.
Figure 3:
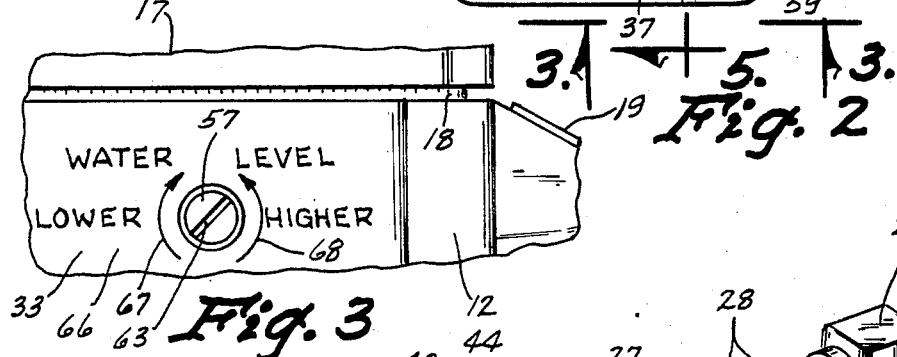
FIG. 3 is a greatly enlarged view of a portion of the side of the livestock waterer, showing an exposed end portion of this invention.
Figure 4:
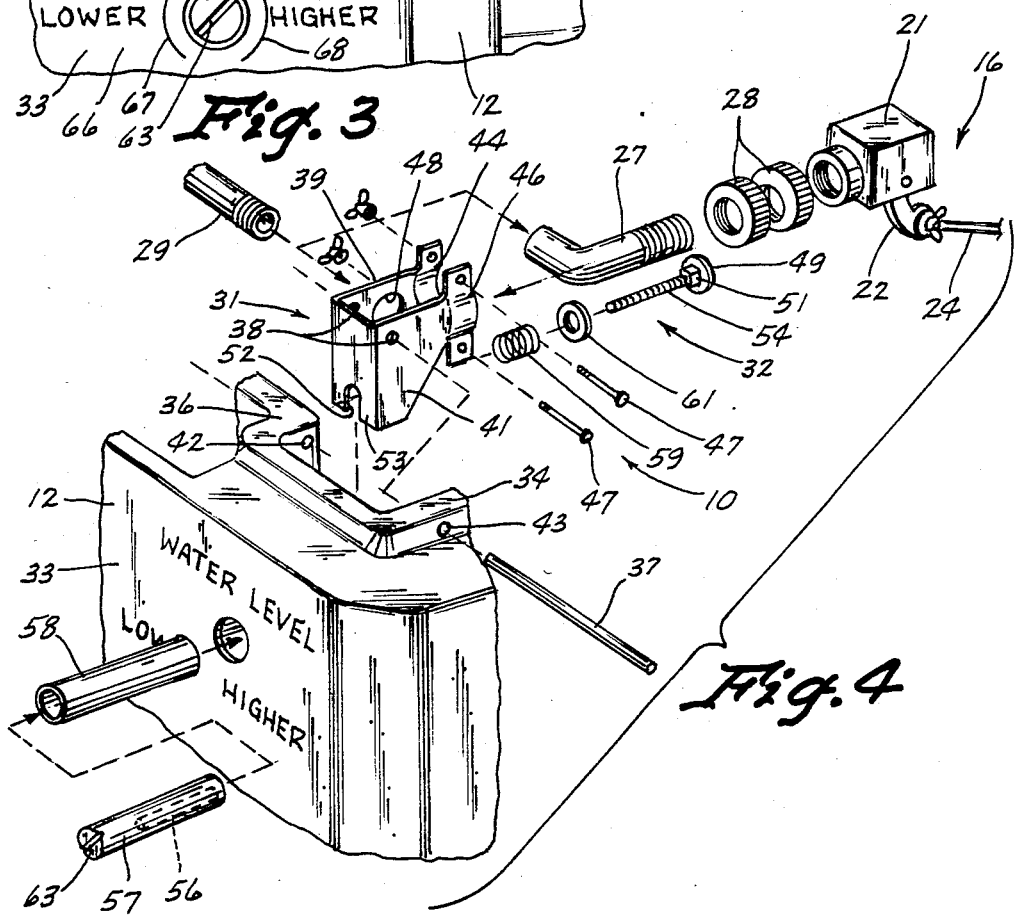
FIG. 4 is a further enlarged exploded view of the invention.

As best indicated in FIG. 4, the water supply plumbing includes not only the intermediate tube (27) which is connected to the float valve (21), but also a pair of threaded connectors (28), and a flexible supply tube (29)

connected at one end to the tube (27) and at the other end to a source (not shown) of water.

The improvement of this invention, the float valve control assembly (10) is comprised of a bracket (31) (FIGS. 4 and 5) pivotally mounted to the base (12) and connected to the tube (27) for holding the float valve mechanism (16), and a fine adjustment device for the float valve (21) indicated generally at (32) (FIGS. 4 and 5) and mounted in one side wall (33) of the base (12). More particularly, the bracket (31) is a U-shaped structure nested within a like U-shaped area of the base (12) formed by opposed shoulders (34) and (36) of the base. The bracket (31) is pivotally mounted for rotation about a normally horizontal axis formed by a pin (37) (FIG. 4) inserted through openings (38) formed in the bracekt arms (39), (41), and mounted in bores (42), (43) formed therefor in the base shoulders (34), (36). The outer ends (44), (46) of the bracket arms (39), (41) are formed to clamp on opposite sides of the water tube (27), conventional nut and bolt devices (47) being provided to connect and hold the bracket arms (39), (41) to the tube.

An opening (48) is formed in one (39) of the bracket arms through which a portion (49) of the water tube (29) extends, and it will be noted that as the tube (29) is flexible, pivoting of the bracket (31) does not twist the tubes (27) and (29). By this arrangement, any pivotal movement of the bracekt (31) about the pin (37) will therefore result in a lifting or depressing movement of the entire float valve mechanism in the same direction as the arrow in FIG. 5, resulting in the opening or closing of the float valve (21) being changed.

Such pivotal movement of the bracket (31) is effected by the fine adjustment device (32) (FIGS. 4 and 5) comprised of a threaded cap screw (49) having a square shank (51) inserted into an opening (52) formed therefor in the face (53) (FIG. 4) of the bracket (31), such that the cap screw (49) cannot rotate. The threaded end (54) of the cap screw (49) is threadably inserted into the internally threaded end (56) of a shaft (57). The shaft (57) is inserted into a cylinder (58) held in the side wall (33) as best shown in FIG. 5. A biasing spring (59) is placed over the stem of the cap screw (49) and extends between a washer (61) held against the shank (51) and the inner surface (62) of the side wall (33). The function of the spring (59) is to hold the cap screw shank (51) in place in the face opening (52).

At the outer exposed end of the shaft (57), a slot (63) is formed for receiving a screw driver end or the like, for effecting rotation of the shaft (57). The rotation of the shaft (57) in place results in like threaded rotation of the cap screw (49) due to its shank end (51) being held stationary, which rotation effects pivoting movement of the bracket (31) and the float valve mechanism (16).

To enable the operator to readily tell which way to rotate the shaft (57) to raise or lower the water level (64) (FIG. 5), the outer surface (66) of the side wall (33) has embossed or printed thereon directions such as "LOWER" with an arrow (67) in a clockwise direction, or "HIGHER" with an arrow (68) indicating the shaft (57) should be turned in a counterclockwise direction. Thus, a very fine adjustment device (32) provides excellent external control of the positioning of the float (23) and thus quantity and level of the water (14) within the tank (13), without the operator having to get into the inside of the livestock waterer (11).

Although this invention (10) is disclosed in the environment of a livestock waterer, it is to be noted that the invention (10) could be readily adapted to any container utilizing a conventional valve and float arrangement, such as a water closet, for example.

I claim:

1. An assembly for controlling the level of fluid comprising in combination:

a container for holding the fluid;

a source of supply for discharging the fluid into said container;

a valve connected to said fluid source of supply for controlling the flow of fluid into said container;

a float pivotally connected to said valve and adapted to move from a first position operatively holding said valve open to the flow of fluid therethrough, to a second position operatively holding said valve closed to the fluid flow therethrough;

bracket means pivotally mounted to said container and connected to hold said valve stationary with said holding means; and adjustment means mounted in said container and having an outer end exposed to the exterior of said container and having further an inner end in contacting relationship with said bracket means, said adjustment means adapted upon manipulation of said outer end to pivot said bracket means whereby to pivot said valve and float relative to said container as a single unit for selecting different fluid levels.

2. The assembly of claim 1 wherein a lid is provided for covering the fluid within said container, said lid removably mounted on said container.

3. The assembly of claim 1 wherein said holding means comprises a bracket pivotally mounted by a pin, said pin being inserted into said container whereby said bracket is vertically movable about an axis parallel to the level of the fluid.

4. The assembly of claim 1 wherein said adjustment means comprises a threaded bolt having one end nonrotatably attached to said holding means, and an internally threaded shaft threadably engaged with said bolt threaded end and having an outer end exposed on one side of said container and adapted to be rotated, said shaft further adapted to rotate in place without longitudinal movement relative to said container, whereby rotation of said shaft results in longitudinal movement of said bolt and pivoting movement of said holding means.

5. The assembly of claim 3 wherein said adjustment means comprises a threaded bolt having one end nonrotatably attached to said holding means, and an internally threaded shaft threadably engaged with said bolt threaded end and having an outer end exposed on one side of said container and adapted to be rotated, said shaft further adapted to rotate in place without longitudinal movement relative to said container, whereby rotation of said shaft results in longitudinal movement of said bolt and pivoting movement of said holding means.

6. The assembly of claim 3 wherein said source of supply includes a fluid conduit held by and movable with said bracket.

* * * * *